(12) United States Patent
Tice (10) Patent No.: US 8,935,921 B2
(45) Date of Patent: *Jan. 20, 2015

(54) THERMAL ENGINE CAPABLE OF UTILIZING LOW TEMPERATURE SOURCES OF HEAT

(76) Inventor: Neil Tice, Hillsboro, OR (US)

( * ) Notice: Subject to any disclaimer, the term of this patent is extended or adjusted under 35 U.S.C. 154(b) by 147 days.

This patent is subject to a terminal disclaimer.

(21) Appl. No.: 13/806,487

(22) PCT Filed: Jun. 21, 2011

(86) PCT No.: PCT/US2011/041289
§ 371 (c)(1),
(2), (4) Date: Dec. 21, 2012

(87) PCT Pub. No.: WO2011/163259
PCT Pub. Date: Dec. 29, 2011

(65) Prior Publication Data
US 2013/0118172 A1    May 16, 2013

Related U.S. Application Data

(63) Continuation-in-part of application No. 12/820,374, filed on Jun. 22, 2010, now Pat. No. 8,522,545.

(51) Int. Cl.
*F02G 1/04* (2006.01)
*F01B 29/10* (2006.01)
(Continued)

(52) U.S. Cl.
CPC . *F01K 25/08* (2013.01); *F03G 7/06* (2013.01); *F01K 23/08* (2013.01); *F01K 25/02* (2013.01); *F25B 30/06* (2013.01)
USPC .............................................. 60/528; 60/529

(58) Field of Classification Search
CPC ......... F01K 25/08; F01K 23/08; F01K 25/02; F03G 7/06; F03G 7/065; F24B 30/06
USPC ................................... 60/527–529; 74/49–50
See application file for complete search history.

(56) References Cited

U.S. PATENT DOCUMENTS 3,173,244 A    3/1965    Schutmaat
4,086,769 A    5/1978    Smith
(Continued)

FOREIGN PATENT DOCUMENTS

WO    WO 0187060 A1    11/2001

*Primary Examiner* — Hoang Nguyen
(74) *Attorney, Agent, or Firm* — Timothy E. Siegel Patent Law, PLLC; Timothy E. Siegel (57) ABSTRACT

A heat-driven engine includes a thermally conductive path into the engine, from a heat source and a working medium of a thermostrictive material, having a first temperature of transformation, positioned adjacent to the thermally conductive path. Also, a heat pump of phase change material is positioned adjacent to the working medium and an actuator is controlled to apply stimulus to the heat pump, causing a phase change and an associated release of thermal energy, to drive the working medium above its low-to-high temperature of transformation and controlled to alternatingly remove the stimulus from the heat pump, causing the phase change to reverse, and an associated intake of thermal energy, to drive the working medium below its high-to-low temperature of transformation. Also, heat flow through the thermally conductive path maintains the working medium at a temperature range permitting the heat pump to drive the working medium temperature, in the manner noted.

57 Claims, 8 Drawing Sheets

(51) Int. Cl.
*F01K 25/08* (2006.01)
*F03G 7/06* (2006.01)
*F01K 23/08* (2006.01)
*F01K 25/02* (2006.01)
*F25B 30/06* (2006.01)

(56) References Cited

U.S. PATENT DOCUMENTS

| | | | |
|---|---|---|---|
| 4,197,709 A | 4/1980 | Hochstein | |
| 4,325,217 A | 4/1982 | Golestaneh | |
| 4,603,593 A * | 8/1986 | Clegg | 74/50 |
| 5,442,914 A | 8/1995 | Otsuka | |
| 6,226,992 B1 | 5/2001 | Kutlucinar | |
| 6,872,433 B2 | 3/2005 | Seward et al. | |
| 6,981,374 B2 * | 1/2006 | von Behrens et al. | 60/527 |
| 7,021,055 B2 * | 4/2006 | Gummin et al. | 60/527 |
| 7,036,312 B2 * | 5/2006 | Menard et al. | 60/527 |
| 7,399,112 B2 * | 7/2008 | Haughton et al. | 366/258 |
| 7,775,042 B1 | 8/2010 | Tice | |
| 8,522,545 B2 * | 9/2013 | Tice | 60/527 |
| 2006/0144048 A1 | 7/2006 | Schulz | |
| 2007/0200656 A1 | 8/2007 | Walak | |
| 2008/0303375 A1 | 12/2008 | Carver | |

\* cited by examiner

THERMAL ENGINE CAPABLE OF UTILIZING LOW TEMPERATURE SOURCES OF HEAT

BACKGROUND

Many ideas for improvements in the world's energy usage focus on increasing the efficiency of existing types of engines. Most heat engines are limited in their efficiency by the theoretical efficiency of the Carnot cycle, which requires an increase in operating temperature in order to increase operating efficiency. A typical application for a heat engine is to generate electricity by boiling water to create superheated steam and using the expansion of the steam to drive a turbine attached to a generator. This works very well if two temperature reservoirs can be created with a large temperature difference between them to facilitate a large expansion ratio of the superheated steam as it cools. Other gaseous working mediums having different specific heats and boiling points may be used, but in all cases the maximum efficiency of the heat engine is defined by the increase in temperature which can be achieved in the heat source over the temperature of the heat sink.

If, however, one wishes to harvest a source of thermal energy with a low temperature relative to any available cooling reservoir, then low efficiencies and low power output must be accepted when using currently available heat engine technologies. Accordingly, additional methods of harvesting energy from relatively low temperature sources of thermal energy are desirable.

Some heat engines using phase change materials, such as Nickel-Titanium alloys known as nitinol, have been designed in which the engine efficiency does not depend on the difference in temperature between the heat source and the heat sink. These engines are theoretically capable of utilizing relatively low-temperature sources of heat. These engines, however, tend to be rather inefficient and do not take advantage of the full phase change expansion that nitinol undergoes. Many of the existing designs do not fully insulate the heat source from the heat sink and therefore do not efficiently use the available heat. Accordingly, there is a need for a more efficient engine that utilizes a phase change material.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In a first separate aspect, the present invention may take the form of a heat-driven engine that includes a thermally conductive path into the engine, from a heat source and a working medium of a working medium phase change material, having a low-to-high temperature of transformation and a high-to-low temperature of transformation, positioned adjacent to the thermally conductive path. Also, a heat pump of phase change material is positioned adjacent to the working medium and an actuator is controlled to apply stimulus to the heat pump, causing a phase change and an associated release of thermal energy, to drive the working medium above its low-to-high temperature of transformation and controlled to alternatingly remove the stimulus from the heat pump, causing the phase change to reverse, and an associated intake of thermal energy, to drive the working medium below its high-to-low temperature of transformation. Also, heat flow through the thermally conductive path maintains the working medium at a temperature range that permits the heat pump to drive the working medium temperature, in the manner noted previously.

In a second separate aspect, the present invention may take the form of a method of operating a heat-driven engine that utilizes a heat spreader, to permit a heat path into the engine, from a heat source, a working medium of phase change material, having a low-to-high temperature of transformation and high-to-low temperature of transformation, positioned adjacent to the thermally conductive path and a heat pump of phase change material positioned adjacent to the working medium. A stimulus is applied to the heat pump, causing a phase change and an associated release of thermal energy, to drive the working medium above its low-to-high temperature of transformation. Alternately the stimulus is removed from the heat pump, causing a reverse phase change and an associated intake of thermal energy to drive the working medium below its high-to-low temperature of transformation. Also, heat flow is permitted through the thermally conductive path to maintain the working medium at a temperature range that permits the heat pump to drive the working medium temperature above and below its temperature triggers.

In a third separate aspect, the present invention may take the form of a heat-driven engine that includes a thermally conductive path into the engine, from a heat source; a working medium of phase change material, having a low-to-high temperature of transformation and a high-to-low temperature of transformation, positioned adjacent to the thermally conductive path; a heat pump of phase change material positioned adjacent to the working medium. A stimulus is applied to the heat pump, causing a phase change and the associated release of thermal energy, to drive the working medium above its low-to-high temperature of transformation and then the stimulus is removed from the heat pump causing the phase change to reverse, along with an associated intake of thermal energy, to drive the working medium below it high-to-low temperature of transformation. Further causing heat flow through the thermally conductive path and maintaining the working medium at a temperature range that permits the heat pump to so drive the working medium temperature. Also, the thermally conductive path includes a heat flow constricting element, to avoid heat flow that does not conform to desired characteristics.

In a fourth separate aspect, the present invention may take the form of a cam assembly, for translating rotary movement of a first cycle type and producing from it linear movement having a second cycle type. The assembly includes a slider plate, supported by a pair of linear bushings and defining an aperture having a non-round shape; a first shaft being driven rotationally through movement of the first cycle type; and a cam-following projection joined to the first shaft by a crank that is fit into the aperture and follows the outline of the aperture as the first shaft moves through the first cycle type, causing the slider plate to move through its second cycle type.

In addition to the exemplary aspects and embodiments described above, further aspects and embodiments will become apparent by reference to the drawings and by study of the following detailed descriptions.

Exemplary embodiments are illustrated in referenced drawings. It is intended that the embodiments and figures disclosed herein are to be considered illustrative rather than restrictive.

DETAILED DESCRIPTION

Figure 1:
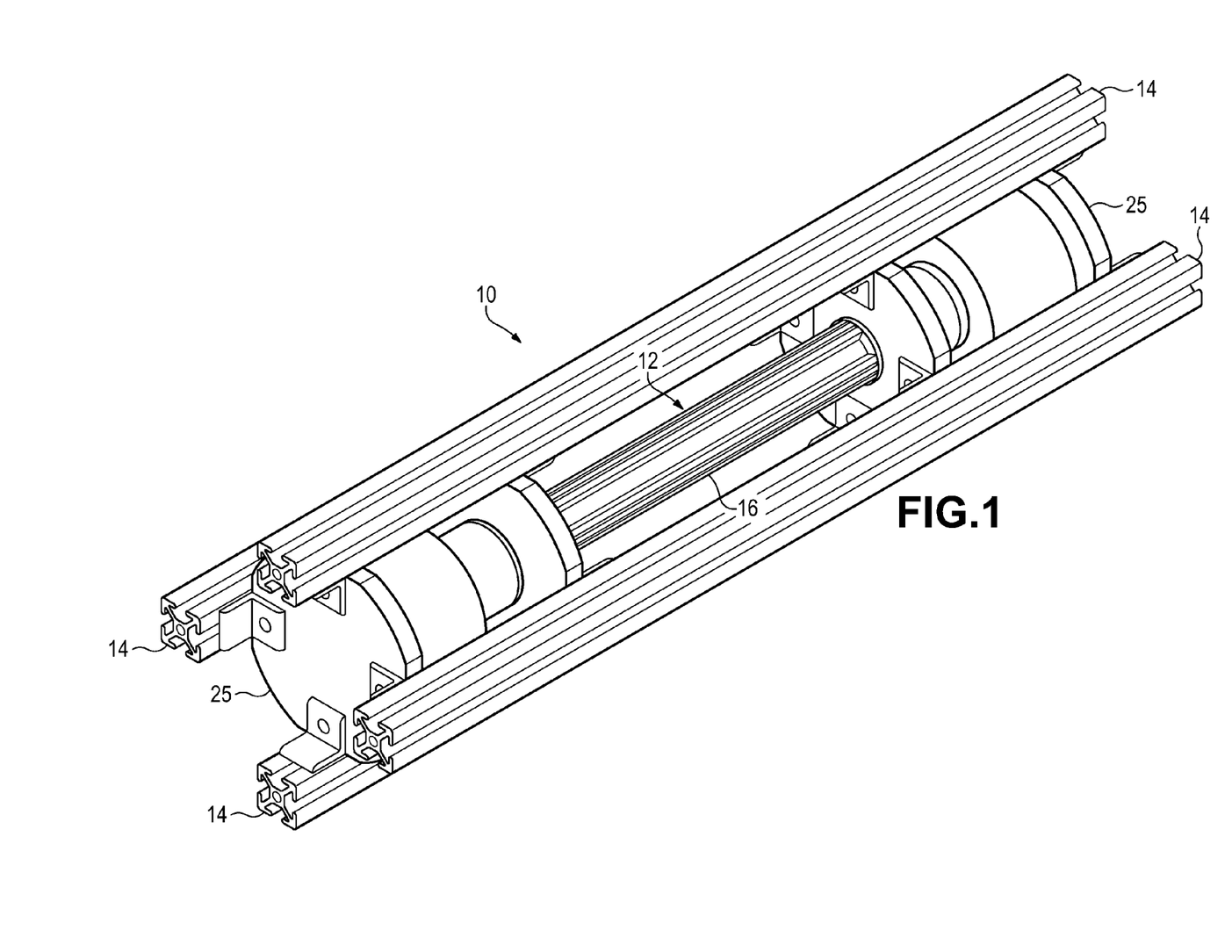
FIG. 1 is a perspective view of a proof-of-concept heat engine, according to the present invention.
Figures 2, 3:
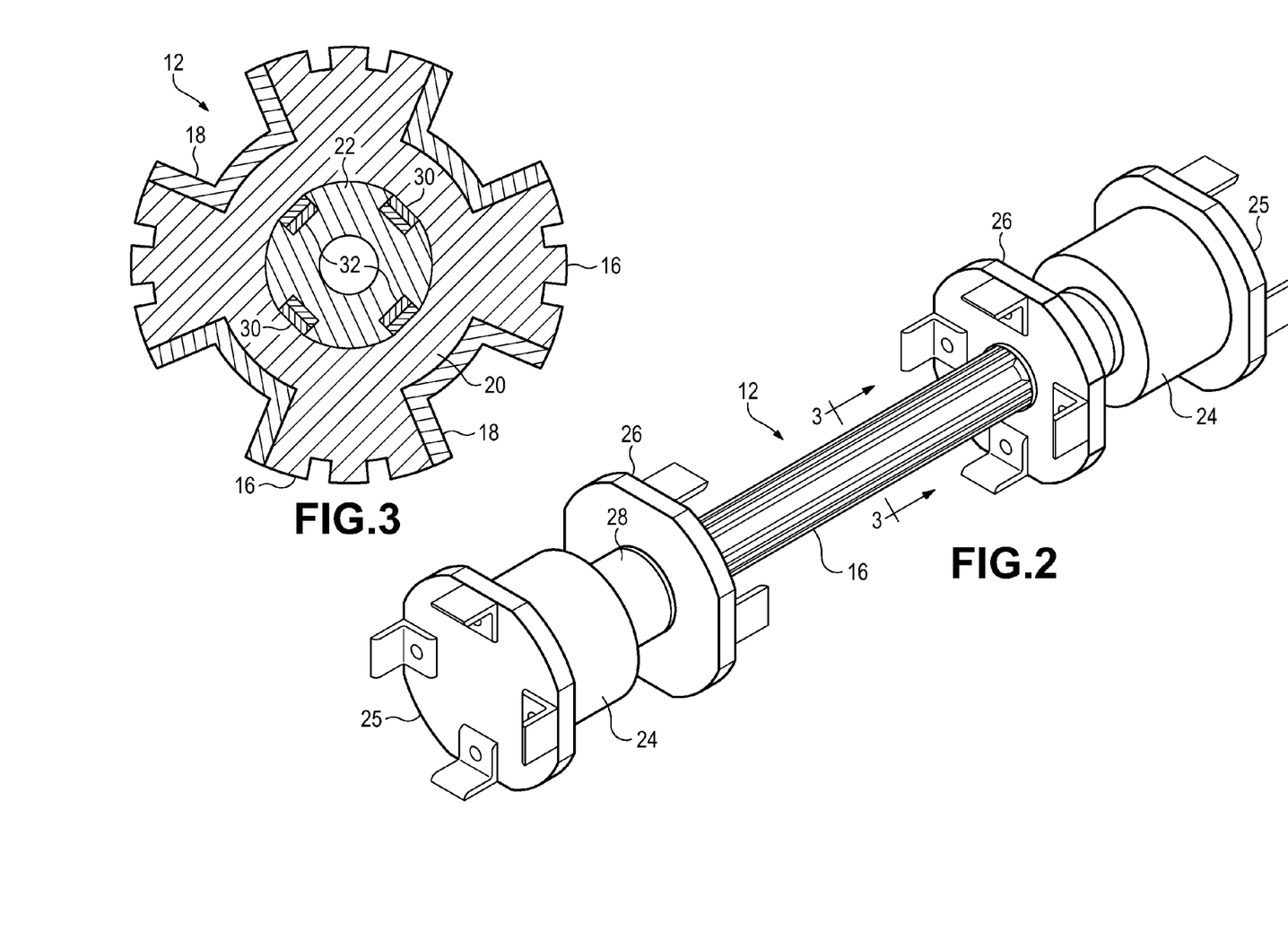
FIG. 2 is a perspective view of the interior elements of the heat engine of FIG. 1
FIG. 3 is a sectional view of the shaft of the interior elements of FIG. 2, taken at line 3-3 of FIG. 2.

Referring to FIG. 1, a proof-of-concept preferred embodiment of a heat engine 10 includes a working mechanism 12, which is rigidly attached at either end to a set of four support columns 14. Referring to FIGS. 2 and 3, a central shaft 16, includes thermally insulating portions 18, thermally conductive heat spreader 20 and thermally insulating core 22. Between conductive heat spreader 20 and insulator 22 four pairs of a shape memory alloy (SMA) working medium 30 and an SMA heat pump 32 are arranged. Working medium 30 moves moveable clamp 28 and heat pump 32 is held by a stationary clamp 26. By applying heat to conductive portion 20, the working mediums 30 expand and contract, causing a magnetically permeable core (not shown) to move back and forth within a solenoid 24, mounted on solenoid mounting plate 25, to generate electricity. This movement is explained below, with reference to FIGS. 4, 5 and 14.

Figure 4:
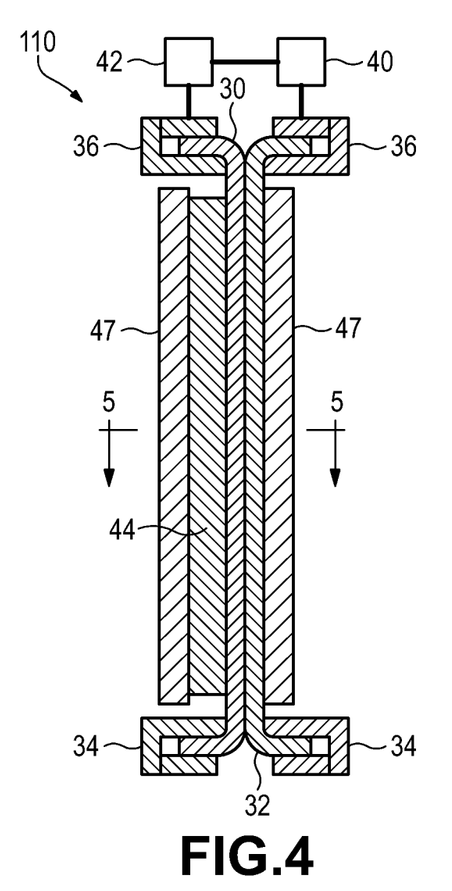
FIG. 4 is a schematic side view of a heat engine, according to the present invention.
Figure 14:
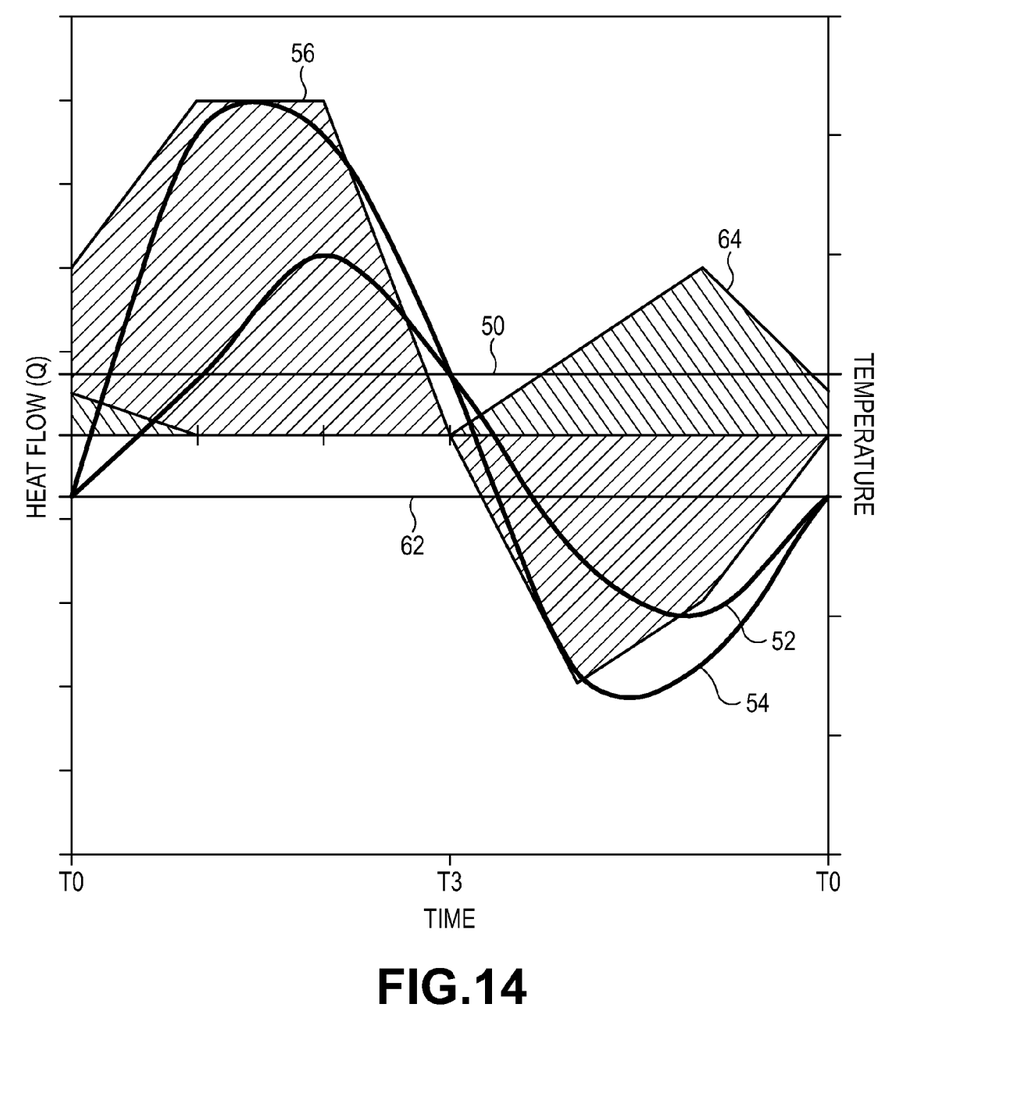
FIG. 14 is a graph of temperature and heat flow between the major elements of the present invention.

A preferred embodiment of a heat engine 110 uses a working medium 30, made of nitinol, to convert heat energy into kinetic energy. An adjacent heat pump 32, also made of nitinol, is kept above its temperature of transformation (lower than that of the working medium 30). Stationary clamps 34 keep working medium 30 and heat pump 32 fixed in position at one end, whereas moveable clamps 36 permit motion on the other end. A heat spreader 44, is driven by heat source 46 (FIG. 5) and periodically warms working medium 30, as described further below. Thermal insulation 47 prevents heat from escaping into the environment. Referring to FIG. 14, at time T0, both working medium temperature (curve 52) and heat pump temperature (curve 54) are below the working medium low-to-high trigger temperature. The heat pump 32 is then stressed by actuator 40, forcing heat pump 32 into its pliable, Martensite, low-enthalpy state, and releasing heat energy (shown by a heat pump-to-working medium heat flow shaded area 56) that had been stored in the crystalline structure of the nitinol. Heat pump 32 heats up, and heat flow from heat pump 32 to working medium 30 begins. This causes the temperature of the working medium 30 to pass the low-to-high trigger 50, causing the working medium 30 to change phases into its shorter, Austenite, high-enthalpy state. As the working medium 30 contracts, it exerts mechanical force that is harvested by kinetic energy harvesting mechanism 42.

While the transition of working medium 30 to its shortened, high-enthalpy state progresses, the temperature of the heat pump 32 and working medium 30 continue to rise, until the heat pump 32 transition to its low enthalpy state is largely complete. The transition of working medium 30 to its high-enthalpy state, continues (this transition began after the start of the transition of heat pump 32), causing medium 30 to absorb its latent heat of transformation, which is stored in its high-enthalpy crystalline structure. This phenomenon begins to cool down both working medium 30 and heat pump 32.

While heat pump 32 is in its low-enthalpy Martensite state, it has the physical characteristic of a spring in tension, exerting force on actuator 40. At time T3, to push the temperature of working medium 30 below its high-to-low enthalpy trigger 62, the actuator 40 of heat pump 32, permits itself to be pulled by heat pump 32, thereby permitting heat pump 32 to transition to its shorter, Austenite, high-enthalpy state, absorbing its latent heat of transformation, thereby and causing its temperature to plunge and drawing heat from working medium 30. Energy may be harvested from the heat pump 32 at this time, compensating in part for the expenditure of kinetic energy at time T0. Soon, the temperature of working medium 30 falls below the working medium high-to-low trigger 62, which causes working medium 30 to undergo the phase change to its pliable, Martensite, low-enthalpy state. Mechanism 42 exerts a relatively small force on working medium 30, causing it to elongate and resetting it for the purpose of creating productive work against mechanism 42 during the next cycle. While the temperature of working medium 30 is below the temperature of the heat spreader 44, medium 30 is warmed by the heat spreader 44 (shown in FIG. 14 by a heat source-to-working medium heat flow shaded area 64), and in turn heats heat pump 32. Moreover, as working medium 30 transitions to its pliable, Martensite, low-enthalpy phase, it releases its latent heat of transformation (less the thermal energy which has been converted to mechanical work), also contributing to the warming of medium 30 and heat pump 32. This leads the heat and transformation cycle back to the starting point, at which point heat pump 32 is pulled, beginning the cycle over again.

Figure 4A:
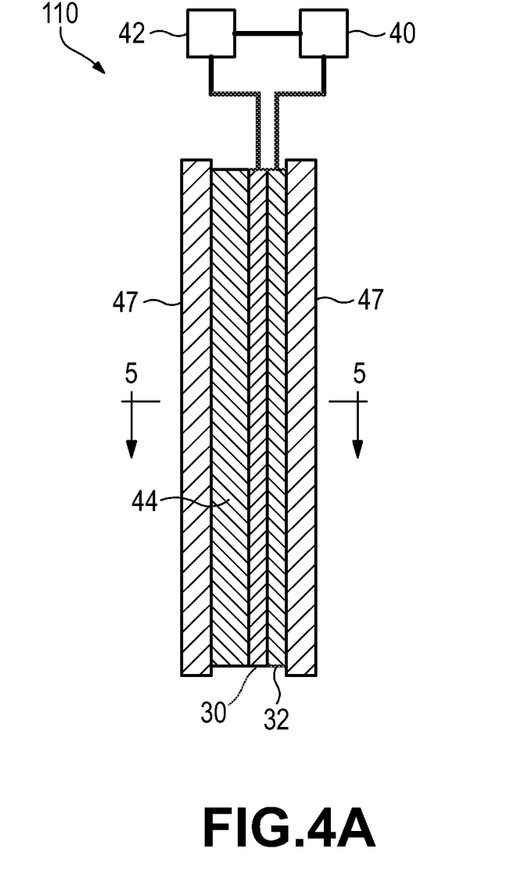
FIG. 4A is a schematic view of a heat engine that is similar to that of FIG. 4, except for that shape memory alloy elements have been replaced by cylinders containing phase change materials.

Referring to FIG. 4A, In an alternative preferred, either 30 or the heat pump 32 can comprise an expandable cylinder that is filled with a phase-change material that undergoes a phase change, from liquid-to-gas, from liquid-to-solid or from solid-to-gas. In all of these cases (with the exception of water) the phase change material is compressed or cooled to cause phase-change to a lower volume phase, and is expanded or heated to cause phase change to a higher volume phase.

More specifically, in the case of a working medium 30, incorporating a liquid-to-vapor phase change material, the cycle begins with the working medium 30 in its liquid phase, at a relatively low pressure and a temperature at the operating temperature of the engine 110. Heat energy from heat spreader 44 together with heat from actuating the heat pump 32, causes a rapid vaporization (a flash boil), which causes the working medium cylinder to expand, thereby doing work against mechanism 42. This expansion causes the temperature of working medium 30 to fall and heat absorption from a de-actuated heat pump causes the temperature of medium 30 to fall below the condensation point, causing contraction of cylinder 30, and bringing the mechanism back to the beginning of the cycle. If heat pump 32 is also a liquid-to-vapor expandable cylinder, it is actuated by a sudden contraction, causing a rapid expression of heat, and heat pump 32 is de-actuated by a sudden expansion, causing its temperature to drop and causing it to absorb heat from working medium 30.

Skilled persons will recognize that this same principal of operation could be used with an expandable cylinder filled with a material that expands during a solid-to-liquid transformation or a solid-to-gas transformation for either working medium 30 or heat pump 32 or both. If water, or some other material that contracts when transforming from solid-to-liquid is used, the mechanism is constructed to accommodate this difference.

Figure 5:
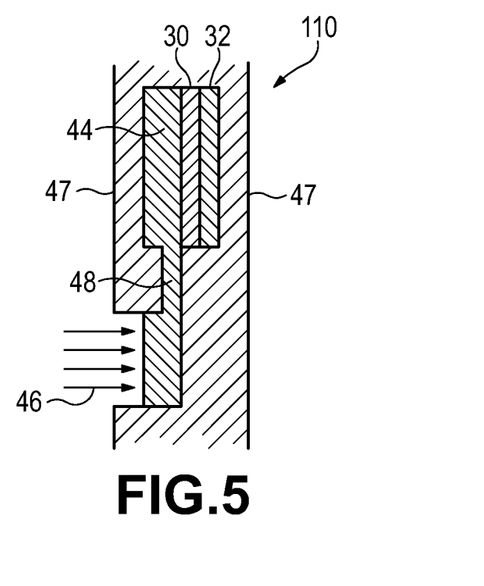
FIG. 5 shows a sectional view of the engine of FIG. 4, taken along line 5-5 of FIG. 4.
Figure 5A:
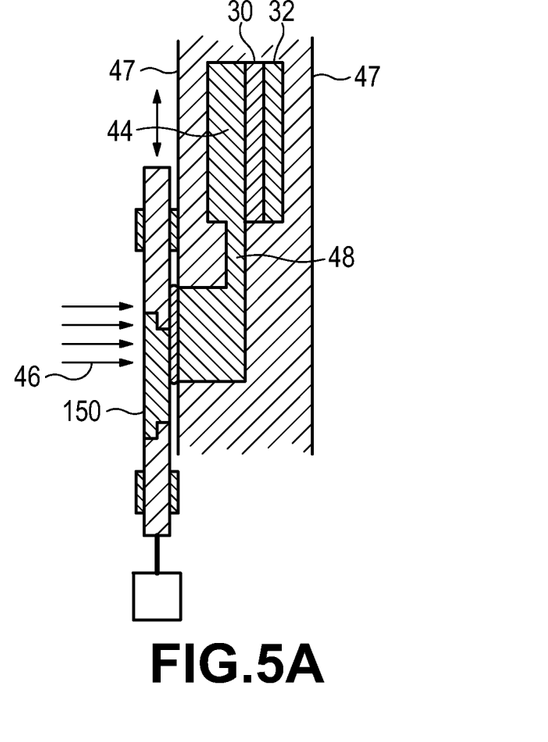
FIG. 5A is a sectional view of the engine of FIG. 4, taken from the same perspective as FIG. 5, showing a heat throttle mechanism that could be used with any of the embodiments.
Figure 6:
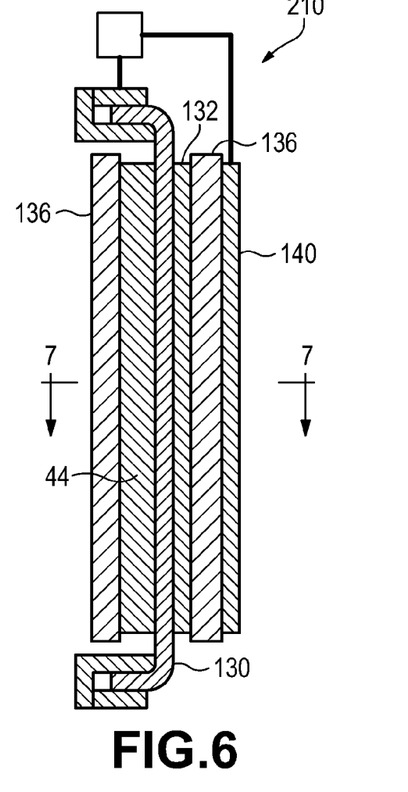
FIG. 6 is a schematic side view of an alternative embodiment of a heat engine according to the present invention.
Figure 7:
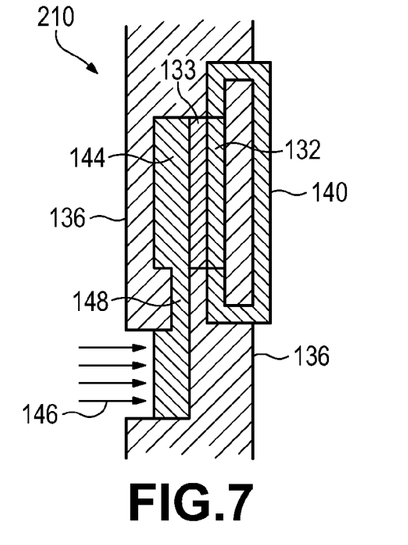
FIG. 7 is a sectional view of the engine of FIG. 6, taken along line 7-7.

Referring to FIG. 5, a heat source 46 sends heat into heat spreader 44, but is partially isolated from working medium 30, by area of lower total thermal conductivity 48, to limit any back flow of heat from working medium 30 into heat source 46, when working medium 30 is at its hottest, and to limit the heat flow from the heat source 46 to no more than that which can be converted to mechanical energy. Referring to FIG. 5A, other devices, such as a mechanical shutter 150, adapted to decrease heat flow in a partially closed or closed position, could also be used to limit the heat flow to and from the heat source 46. A sensing and control assembly reads the temperature in the heat spreader 44 and places shutter 150 in a further closed position if the heat spreader is too hot. In an alternative preferred embodiment, element 150 schematically represents a variable-conductance heat pipe, controlled responsively to the temperature of heat spreader 44, heat source 46, and to the requirement for output of mechanical energy or the actual contemporaneous output of mechanical energy. Additionally, in one preferred embodiment, more than one heat source is connected, each by way of a separate variable-conductivity heat pipe, to heat spreader 44. In an example of such an embodiment a first heat source is a solar collector and a second heat source is a backup fuel-burning heat source. When the fuel-burning heat source is in use, the variable-conductivity heat pipe to the solar collector can be set to lowest conductivity, to prevent the heat from the fuel-burning heat source from flowing to the solar collector. In yet another alternative, a thermal diode is used to prevent heat flow from heat spreader 44 back to a heat source 46, or in the case of multiple heat sources, from one heat source to another. Referring to FIG. 6, in an alternative embodiment of a heat engine 210, working medium 130 is warmed and cooled by a heat pump 132 that is magneto-caloric, and is caused to change phase by the application of a magnetic field, by electromagnet 140, serving as the actuator for heat pump 132 and separated from pump 132 by insulator 136. Alternatively, heat pump 132 is pyro-electric, with electric field generator 140 actuating it by creating an electric field, and insulator 136 again providing physical separation. Element 142 both harvests kinetic energy from working medium 130 and powers and controls field generator 140. FIG. 7 shows heat source 146, area of lower total thermal conductivity 148 and heat spreader 144, which perform in similar manner to the like elements of FIG. 5.

Figure 8:
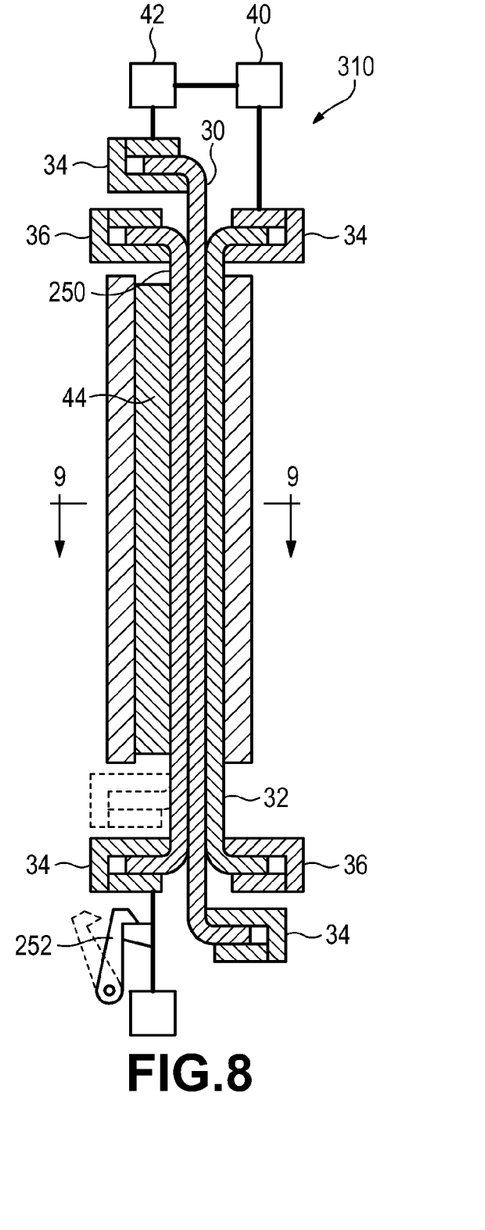
FIG. 8 is a schematic side view of an additional alternative embodiment of a heat engine, according to the present invention.
Figure 9:
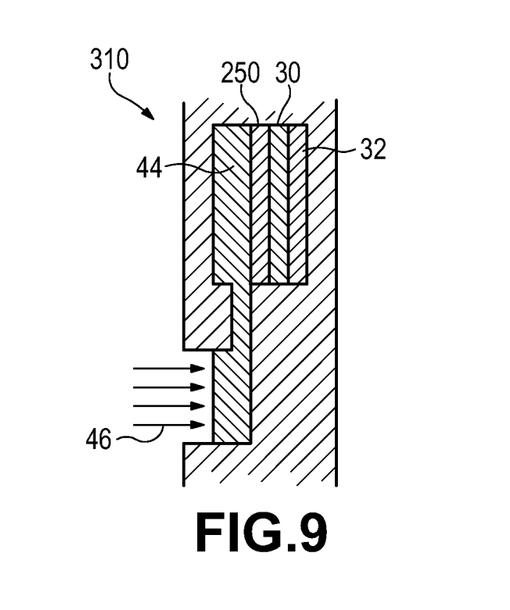
FIG. 9 is a sectional view of the engine of FIG. 8, taken along line 9-9 of FIG. 8.
Figure 10:
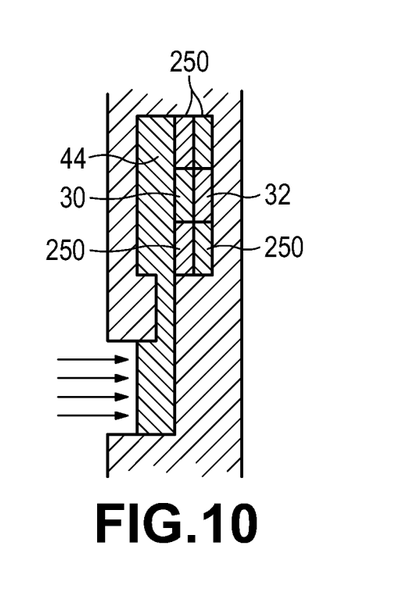
FIG. 10 is a sectional view of a variant of the engine of FIG. 8, taken along line 9-9 of FIG. 8.

Referring to FIG. 8, an embodiment of a heat engine 310 is shown which, unlike the embodiment of FIG. 5, includes a starter element 250, intended for use in designs where the working medium 30 and heat pump 32 may increase in temperature above the desired operating temperature during time periods when the heat engine 310 is not operating, resulting in more difficult heat engine starting. The starter element thereby relieves the design requirement that the heat pump 32 be sized adequately to start the engine cycle by absorbing the extra heat required to lower the system temperature to less than the low-enthalpy to high-enthalpy transition temperature of the working medium 30. Starter 250, typically also made of nitinol shape memory alloy, is kept in tension in its low-enthalpy pliable state by the latch 252 during periods when the engine is not operating. When it is desired to start the engine cycle, element 250 is released by latch 252, thereby transforming to its shortened high-enthalpy state, absorbing its latent heat of transformation and causing a drop in temperature in itself, working medium 30 and heat pump 32. This causes working medium 30 to undergo a transformation from its high-enthalpy, shortened state, to its low-enthalpy, pliable state. In this embodiment, working medium 30 and heat pump 32 are linked by a power transmitting element, as will be explained further below in reference to FIG. 12. The forces applied to working medium 30 and heat pump 32 by actuators 40 and 42 are further controlled arbitrarily by a timing device, one example of which will be explained further below in reference to FIG. 12. Accordingly, when working medium 30 becomes pliable and is caused to elongate, this causes, after a delay, heat pump 32 to be pulled into its elongated, low-enthalpy state, causing a release of heat. The engine cycle is now in a state approximately equal to T1 in FIG. 14, and the cycle is now self-perpetuating with heat flowing through starting element 250 to working medium 30, as shown in FIG. 9. FIG. 10 shows, however, that the starting element 250, working medium 30 and heat pump 32 can be arranged in any one of a number of different configurations, some of which avoid the necessity of heat flowing through starting element 250, to reach working medium 30.

Figure 8A:
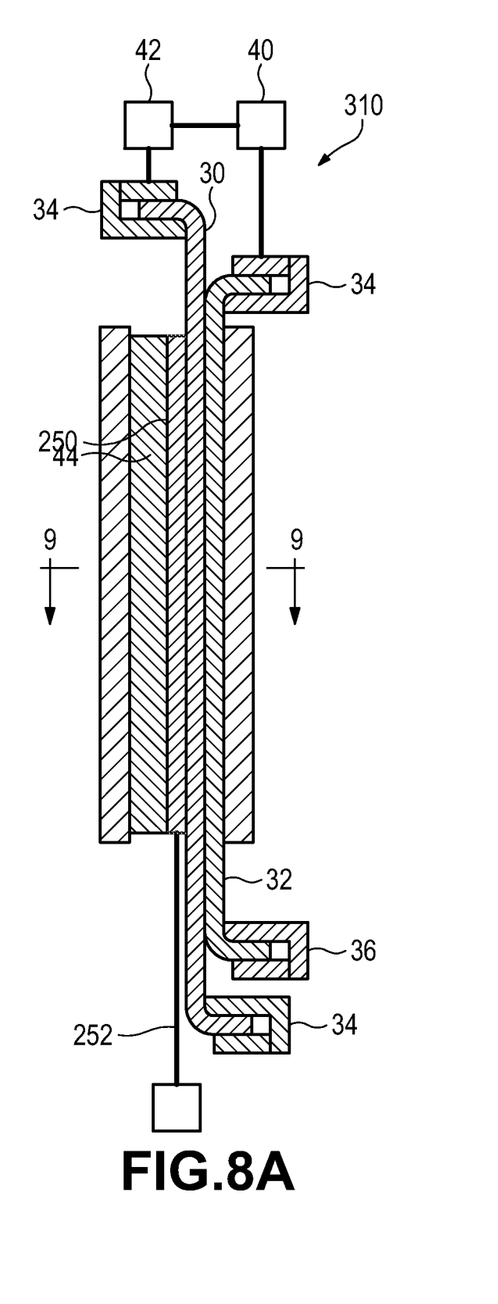
FIG. 8A is a schematic side view of a heat engine, similar to that of FIG. 8, but wherein the shape memory alloy starter has been replaced by a starter of a differing form.

FIG. 8A depicts a heat engine 110', similar to engine 110 of FIG. 8, but wherein starter element 250 can take any one of several different forms including one or more magneto-caloric elements, stimulated by a magnetic field producing actuator 252; one or more pyro-electric elements, stimulated by an electric-field producing actuator 252; an electro-mechanical heat pump, controlled by an actuator 252 in the form of an electrical switch; or a volume adjustable cylinder filled with a phase change material, such as water. Any cooling device which, when brought into thermal contact directly or indirectly, will absorb enough thermal energy to lower the temperature of the working medium down to a starting temperature can serve as a starting element 250. In the volume-adjustable cylinder embodiment a starting element actuator 252 pulls on starter element cylinder 250, causing a sudden drop in temperature of element 250, which in turn causes a drop in temperature of working medium 30, which starts heat engine 110'. Alternatively starting element 250 takes the form of a fluid passageway and actuator 252 is a cold-fluid blower, which creates a stream of cold fluid that cools working medium 30 and starts engine 110'.

Figure 11:
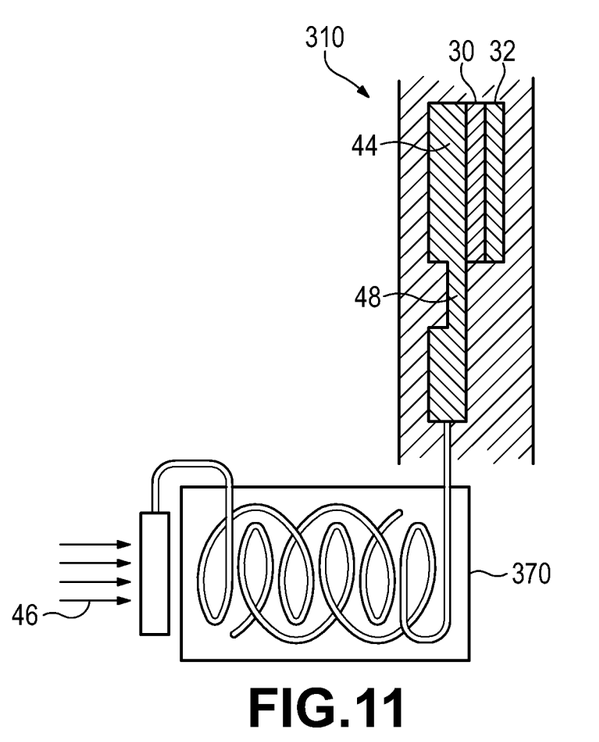
FIG. 11 is a sectional view of the engine of FIG. 4, taken from the same perspective as FIG. 5, showing a heat reservoir that could be used with any of the embodiments.

Referring to FIG. 11, in an instance in which a heat source, such as source 46 is inconstant, a thermal mass or other sort of heat stabilizer 370, can be used to provide a constant-temperature heat source to engine 310 at a temperature close to the operating temperature of the engine 310. In one embodiment stabilizer 370 includes a medium having a relatively large specific heat or a medium which undergoes a phase change (thus absorbing or releasing a relatively large latent heat) at a temperature near the operating temperature of the engine. Examples of these mediums could be cast iron or a large volume of water, having a large capacity to absorb heat. Further examples may include eutectic salts or organic chemicals having a phase change at approximately the operating temperature of engine 310. Heat transfer into and out of the stabilizer 370 may be assisted by a heat exchange device, composed of, alternately, a solid finned structure, pipes through which liquid is pumped, or a series of evacuated heat pipes.

Figure 12:
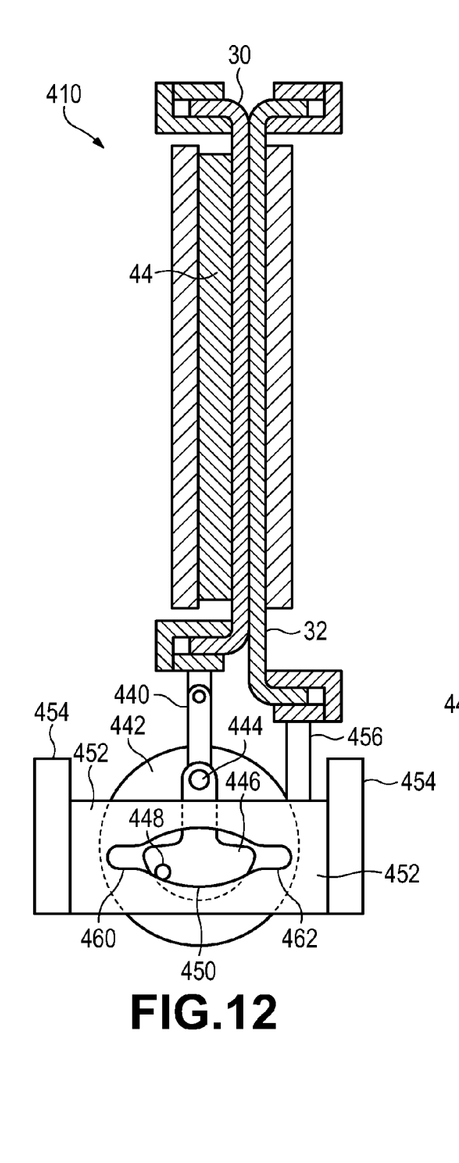
FIG. 12 is a schematic side view of the engine of FIG. 4, showing a cam mechanism that could be used with any of the embodiments to alter the timing of the motion created by the engine, thereby making this motion useful as an engine input.

Referring to FIG. 12, which shows an embodiment of a heat engine 410 in which working medium 30 is mechanically linked to heat pump 32, in such a manner that after engine 410 is started heat pump 32 is mechanically driven by working medium 30 so that heat pump 32 is pulled, causing elongation and a release of heat, a fixed delay after working medium 30 has reached its maximum length and heat pump 32 is permitted to shorten, causing absorption of heat, a fixed delay after working medium 30 has reached its shortest length.

Working medium 30 drives a shaft 440 hinged at the top and connected by hinge 444 to both a clockwise rotating flywheel and a counterweight 446 that supports a cam follower 448. Cam follower 448 is constrained in its movement by cam aperture 450, which is defined by a slider plate 452, supported and permitted to slide by linear bushings 454. A driving shaft 456, which is driven by plate 452 alternatingly pulls and pushes heat pump 32.

FIG. 12 shows heat engine 410 at time T3 in FIG. 14, with working medium 30 in its shortened high-enthalpy Austenite phase and heat engine 32 constrained to be in its lengthened, low enthalpy Martensite phase by the pressure of the cam follower 448 on the inside of cam aperture 450. As the inertia of flywheel 440 causes it and the cam follower 448 to continue their clockwise rotation, cam follower 448 slips into a first notch 460 and the circular path of the cam follower 448 allows the slider plate 452 to move upwards under the influence of the force exerted on it through shaft 456 by heat pump 32, which displays, at this phase in the cycle, characteristics similar to those of a spring held in tension. This causes the phase change and rapid cooling of heat pump 32, which also cools the working medium 30 as shown on FIG. 14 between T3 and T4. Further constriction of heat pump 32, allowed by working medium 30 crossing its high-to-low trigger temperature 62 and undergoing the phase change to its low-enthalpy, pliable state, causes cam follower 448 to follow the upper curve of cam aperture 450 until it enters second notch 462. This is approximately time T0 on FIG. 14. At this point the inertia of the flywheel 442 causes cam follower 448 to enter second notch 462 and exert force downward on slider plate 452, causing the elongation of heat pump 32 and the release of its latent heat of transformation; thus driving the temperature of working medium 30 above its low-to-high trigger 50 and causing working medium 30 to undergo a phase change to its constricted, high-enthalpy state and the cycle to begin anew. In a preferred embodiment, over a complete cycle, the thermal energy converted to kinetic energy by the working medium 30, is greater than the net kinetic energy input into the heat pump 32, thereby creating a self-sustaining cycle.

Figure 13:
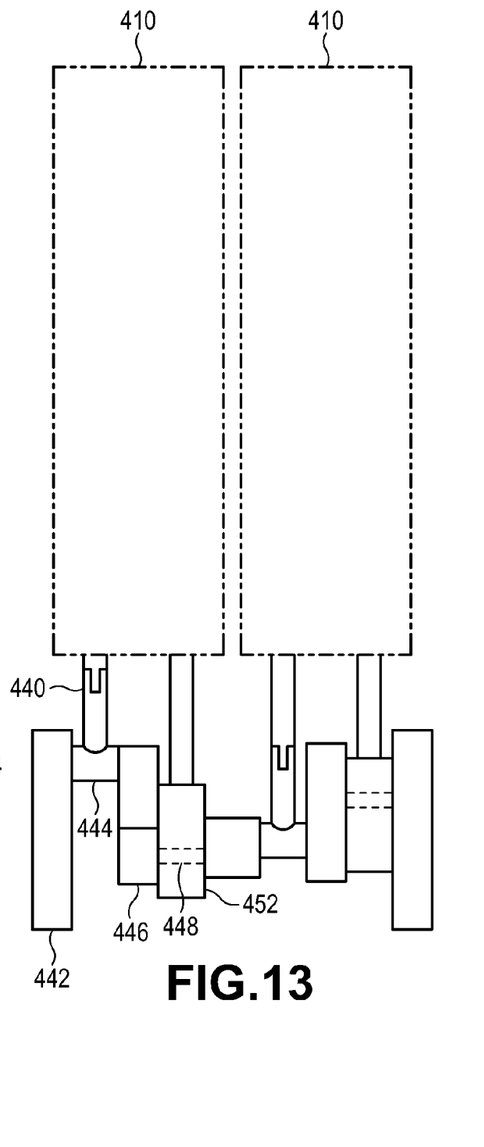
FIG. 13 is a top view of a pair of heat engines, joined together to achieve improved performance.

FIG. 13 shows two heat engines 410 mechanically linked together and with their cycles arranged out of phase so that each one complements the other. Further, there may be more heat engines 410 mechanically linked in like manner, arranged with their cycles at various phase relationships to each other.

There are two criteria which are critical for choosing a nickel-titanium (nitinol) alloy for use as the shape memory allow material. The first is the relationship of the Austenite start temperature to the operating temperature of the engine. The Austenite start temperature (As) is the temperature at which the phase change in the nickel-titanium crystalline structure from Martensite (the low-enthalpy state) to Austenite (the high-enthalpy state) begins to take place.

Nitinol is an alloy of nickel and titanium with approximately 50% Nickel and 50% Titanium by atomic count. The As of a nitinol can be reduced by increasing the ratio of nickel to titanium, and increased by reducing the ratio of nickel to titanium. As can be further affected by the heat treatment applied to the alloy during fabrication. Increasing the aging time and temperature of the heat treatment depletes nickel from the Ni—Ti lattice, thus increasing As. Using these methods, the Austenite start for the working medium 30 and heat pump 32 can be set to a temperature which allows for the operation of the heat engine.

The average mechanical work output by the working medium 30 is determined by the average rate of heat flow from the heat spreader 44 into the working medium 30. This rate of heat flow is determined by the difference between the temperature of the heat source and As of the Working Medium. If the operating temperature of the heat source is known, the As of the working medium 30 (and the proportion of Ni to Ti) can be specified so as to balance the heat input to the working medium 30 with the mechanical work output (plus inefficiencies).

The As of the heat pump 32 is specified in a different fashion; the heat pump 32 alloy is superelastic, undergoing the stress-induced transformation rather than a temperature-induced transformation. In order to satisfy this condition, the Heat Pump alloy must have an As lower than any temperature it will be subjected to during the operation of the heat engine, such that it will always be in the high-enthalpy state unless subjected to enough stress to cause it to transition to the low-enthalpy state.

The second criteria by which the nickel-titanium alloy should be chosen is the hysteresis temperature. The hysteresis temperature is defined as the difference between the Austenite start temperature and the Martensite start temperature (Ms). The Martensite start temperature is the temperature at which the temperature-induced transformation of the Nitinol crystalline structure from Austenite to Martensite begins to occur.

The hysteresis temperature of the working medium 30 should be as small as is practical, because the thermal energy required to raise or lower the temperature of the Working Medium by the hysteresis temperature is wasted heat energy, which must be absorbed and released by the heat pump 32 in order to cause the working medium 30 to change phase. A larger hysteresis temperature requires a larger heat pump 32, and increased inefficiencies in the total system.

One method of reducing the hysteresis temperature of nitinol is to add a small amount of a third element to the alloy; often this third element is copper.

The present device and method provide broader applicability for a process of converting thermal energy to mechanical energy by eliminating the requirement for a "cold reservoir". The elimination of the step of cold reservoir cooling of a working medium also yields a significant increase in efficiency. Thermal energy from the heat source 46 is converted directly into mechanical energy by working medium 30 during its phase change from the low-enthalpy state to the high-enthalpy state. That portion of the latent heat of transformation of working medium 30 which is not so converted is released by working medium 30 during its phase change from the high-enthalpy state to the low-enthalpy state, and is absorbed by heat pump 32 during its phase change from the low-enthalpy state to the high-enthalpy state. The thermal energy thus absorbed by heat pump 32 is released again and flows back to working medium 30 during its phase change from the low-enthalpy state to the high-enthalpy state. Disregarding system inefficiencies such as heat loss to the environment through insulated or non-insulated portions of the device, all thermal energy that might otherwise be "waste heat" is thus recycled into working medium 30 in the course of one cycle, making a "cold reservoir" to receive waste heat unnecessary. As long as the thermal energy flowing from the heat source into the working medium 30 can be limited to the quantity that is converted to mechanical energy while the engine is operating plus losses due to system inefficiencies, the device will continue to operate as designed. The conversion of thermal energy to mechanical energy occurs during a phase change in which the crystalline structure of the working medium 30 changes from a low-entropy state to a high-entropy state, and the mechanical energy acts on the environment as work. The thermal energy so converted is no longer contained within the working medium 30, and is therefore not absorbed by heat pump 32. Thus over the course of a cycle of operation, entropy increases. No claim is made that would violate the Clausius Inequality by any of the embodiments of a heat engine according to the present invention.

While a number of exemplary aspects and embodiments have been discussed above, those possessed of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A heat-driven engine comprising
   (a) a thermally conductive path into said engine, from a heat source;
   (b) a working medium that includes a working medium phase-change material with phase dependent volume, having a low-to-high temperature of transformation and a high-to-low temperature of transformation, positioned adjacent to said thermally conductive path;
   (c) a heat pump that includes a heat pump phase change material positioned adjacent to said working medium;
   (d) an actuator controlled to apply stimulus to said heat pump, causing a phase change and an associated release of thermal energy, to drive said working medium above said low-to-high temperature of transformation and controlled to alternatingly remove said stimulus from said heat pump, causing said phase change to reverse, and an associated intake of thermal energy, to drive said working medium below said high-to-low temperature of transformation; and
   (e) wherein, heat flow through said thermally conductive path maintains said working medium at a temperature range that permits said heat pump to so drive said working medium temperature.

2. The engine of claim 1, wherein said working medium phase change material is nitinol.

3. The engine of claim 1, wherein said heat pump phase change material is nitinol.

4. The engine of claim 1, wherein said working medium phase change material is magneto-caloric and is stimulated by the application of a magnetic field.

5. The engine of claim 1, wherein said heat pump phase change material is magneto-caloric and is stimulated by the application of a magnetic field.

6. The engine of claim 1, wherein said working medium phase change material is pyroelectric, and is stimulated by the application of an electric field.

7. The engine of claim 1, wherein said heat pump phase change material is pyroelectric, and is stimulated by the application of an electric field.

8. The engine of claim 1, wherein a controlled variable conductivity heat transmission assembly is used to control the flow of heat from said heat source to said working medium.

9. The engine of claim 8, wherein said controlled variable conductivity heat transmission assembly is a heat shutter.

10. The engine of claim 8, wherein said controlled variable conductivity heat transmission assembly is a variable conductivity heat pipe.

11. The engine of claim 1, wherein a thermal diode is interposed into said thermally conductive path, so as to prevent the reverse flow of heat from said working medium to said heat source.

12. The heat engine of claim 8, further including at least one additional thermally conductive path from at least one additional heat source, and wherein a thermal diode is interposed into at least one thermally conductive path to prevent unwanted heat flow to any heat source.

13. The engine of claim 1, further including a heat stabilizer interposed into said thermally conductive path, having an input thermally connected to said heat source and an output thermally connected to said working medium, said heat stabilizer maintaining a more even temperature at its output than it receives at its input.

14. The engine of claim 13, wherein a heat spreader is thermally interposed between said heat stabilizer output and said working medium.

15. The engine of claim 13, wherein a thermal diode is thermally interposed between said heat source and said heat stabilizer, to prevent flow of heat from said heat stabilizer to said heat source.

16. The engine of claim 1, wherein said actuator is driven by said working medium and comprises a cam assembly, for translating rotary movement of a first cycle type and producing from it linear movement having a second cycle type, and including:
   (a) a slider plate, supported by a pair of linear bushings and defining an aperture having a non-round shape;
   (b) a first shaft being driven rotationally through movement of said first cycle type;
   (c) a cam-following projection joined to said first shaft by a crank that is fit into said aperture and follows the outline of said aperture as said first shaft moves through said first cycle type, causing said slider plate to move through its second cycle type.

17. The engine of claim 1, wherein a cooling device is thermally connected to said working medium, for the purpose of reducing the temperature of said working medium to a temperature below said high-to-low temperature of transformation, thereby serving to start said engine, when desired.

18. The engine of claim 17, wherein said cooling element is a thermostrictive starting element, kept in tension in a low-enthalpy state, until released to start said engine.

19. The engine of claim 17, wherein said cooling device is a magnetocaloric element, kept in a low-enthalpy state by a controlled magnetic field, until de-stimulated to start said engine.

20. The engine of claim 17, wherein said cooling device is a pyro-electric element, kept in a low-enthalpy state by a controlled electric field, until de-stimulated to start said engine.

21. The engine of claim 1, wherein said working medium includes an expandable chamber filled with a first phase change material.

22. The engine of claim 21, wherein said first phase change material undergoes a liquid to gas transformation and a gas to liquid transformation during engine operation.

23. The engine of claim 21, wherein said first phase change material undergoes a solid do liquid transformation and a liquid to solid transformation during engine operation.

24. The engine of claim 21, wherein said first phase change material undergoes a solid to gas transformation and a gas to solid transformation during engine operation.

25. The engine of claim 1, wherein said heat pump includes an expandable chamber filled with a second phase change material.

26. The engine of claim 25, wherein said second phase change material undergoes a liquid to gas transformation and a gas to liquid transformation during engine operation.

27. The engine of claim 25, wherein said second phase change material undergoes a solid to liquid transformation and a liquid to solid transformation during engine operation.

28. The engine of claim 25, wherein said second phase change material undergoes a solid to gas transformation and a gas to solid transformation during engine operation.

29. A method of operating a heat-driven engine, comprising
(a) providing a heat spreader, to permit a heat path into said engine, from a heat source;
(b) providing a working medium of phase change material having phase-dependent volume, and having a low-to-high temperature of transformation and a high-to-low temperature of transformation, positioned adjacent to said thermally conductive path;
(c) providing a heat pump of phase change material positioned adjacent to said working medium; and
(d) controlling an actuator to apply a stimulus to said heat pump, causing a phase change and an associated release of thermal energy, to drive said working medium above its low-to-high heat of transformation and alternately removing said stimulus from said heat pump, causing a reverse phase change and an associated intake of thermal energy to drive said working medium below its high-to-low heat of transformation; and
(e) permitting heat flow through said thermally conductive path to maintain said working medium at a temperature range that permits said heat pump to so drive said working medium temperature above and below its temperature triggers.

30. A heat-driven engine comprising
(a) a thermally conductive path into said engine, from a heat source;
(b) a working medium that includes a working medium phase change material, having a low-to-high temperature of transformation and a high-to-low temperature of transformation, positioned adjacent to said thermally conductive path;
(c) a heat pump that includes a heat pump phase change material positioned adjacent to said working medium; and
(d) wherein a stimulus is applied to said heat pump, causing a phase change and the associated release of thermal energy, to drive said working medium above its low-to-high temperature of transformation and then said stimulus is removed from said heat pump causing the said phase change to reverse, along with an associated intake of thermal energy that drives said working medium below its high-to-low temperature of transformation, further causing heat flow through said thermally conductive path and maintaining said working medium at a temperature range that permits said heat pump to so drive said working medium temperature; and
(e) wherein said thermally conductive path includes a heat flow constricting element, to avoid heat flow that does not conform to desired characteristics.

31. The engine of claim 30, wherein said heat flow constricting element includes a controlled variable conductivity heat transmission assembly which is used to control the flow of heat from said heat source to said working medium.

32. The engine of claim 31, wherein said controlled variable conductivity heat transmission assembly is a heat shutter.

33. The engine of claim 31, wherein said controlled variable conductivity heat transmission assembly is a variable conductivity heat pipe.

34. The engine of claim 30, further including a heat stabilizer interposed into said thermally conductive path, having an input adjacent thermally connected to said heat source and an output thermally connected to said working medium, said heat stabilizer maintaining a more even temperature at its output than it receives at its input.

35. The engine of claim 34, wherein a thermal diode is thermally interposed between said heat source and said heat stabilizer, to prevent flow of heat from said heat stabilizer to said heat source.

36. The engine of claim 30, wherein a cooling device is thermally connected to said working medium, for the purpose of reducing the temperature of said working medium to a temperature below said high-to-low temperature of transformation, thereby serving to start said engine, when desired.

37. The engine of claim 36, wherein said cooling device is a magneto-caloric element, kept in a low-enthalpy state by a controlled magnetic field, until de-stimulated to start said engine.

38. The engine of claim 36, wherein said cooling device is a pyro-electric element, kept in a low-enthalpy state by a controlled electric field, until de-stimulated to start said engine.

39. The engine of claim 36, wherein said cooling device is made of thermostrictive material, kept in a low-enthalpy tension state, until released to start said engine.

40. The engine of claim 30, wherein a thermal diode is imposed on the heat path between said heat source and said heat spreader, so as to prevent the reverse flow of heat from said heat spreader to said heat source.

41. The heat engine of claim 40, further including at least one additional thermally conductive path from at least one additional heat source, and wherein a thermal diode is interposed into at least one thermally conductive path to prevent unwanted heat flow to any heat source.

42. The heat engine of claim 30, wherein said working medium phase change material is a magneto caloric material, which converts thermal energy to magnetic energy and magnetic energy to thermal energy.

43. The heat engine of claim 30, wherein said working medium includes an expandable chamber filled with a first phase change material.

44. The heat engine of claim 43, wherein said first phase change material changes from liquid to gas and then back to liquid, during the course of engine operation.

45. The heat engine of claim 43, wherein said first phase change material changes from solid to gas and then back to solid, during the course of engine operation.

46. The heat engine of claim 43, wherein said first phase change material changes from solid to liquid and then back to solid, during the course of engine operation.

47. The heat engine of claim 43, wherein said first phase change material is a pyro-electric material, which converts thermal energy to electric energy and electric energy to thermal energy.

48. The heat engine of claim 30, wherein said heat pump includes an expandable chamber filled with a second phase change material.

49. The heat engine of claim 48, wherein said second phase change material changes from liquid to gas and then back to liquid, during the course of engine operation.

50. The heat engine of claim 48, wherein said second phase change material changes from solid to gas and then back to solid, during the course of engine operation.

51. The heat engine of claim 48, wherein said second phase change material changes from solid to liquid and then back to solid, during the course of engine operation.

52. The heat engine of claim 48, wherein said second phase change material is a magneto caloric material, which converts thermal energy to magnetic energy and magnetic energy to thermal energy.

53. The heat engine of claim 48, wherein said second phase change material is a pyro-eletric material, which converts thermal energy to electric energy and electric energy to thermal energy.

54. The engine of claim 30, wherein said heat flow engine recited in paragraphs (a) through (d) comprises a first heat flow assembly and further including one or more additional heat flow assemblies, conforming to paragraphs (a) through (d), said heat flow assemblies coupled together by power transmitting elements and maintained in an out-of-phase relationship, so that operation of each said heat flow assembly facilitates operation of all other heat flow assemblies.

55. The engine of claim 16, further including a fly wheel attached to said cam-following projection.

56. The engine of claim 1, wherein said heat flow engine recited in paragraphs (a) through (d) comprises a first heat flow assembly and further including one or more additional heat flow assemblies, conforming to paragraphs (a) through (d), said heat flow assemblies coupled together by power transmitting elements and maintained in an out-of-phase relationship, so that operation of each said heat flow assembly facilitates operation of all other heat flow assemblies.

57. The engine of claim 56, wherein each said power transmitting element comprises a cam assembly, for translating rotary movement of a first cycle type and producing from it linear movement having a second cycle type, and including:
 (a) a slider plate, supported by a pair of linear bushings and defining an aperture having a non-round shape;
 (b) a first shaft being driven rotationally through movement of said first cycle type;
 (c) a cam-following projection joined to said first shaft by a crank that is fit into said aperture and follows the outline of said aperture as said first shaft moves through said first cycle type, causing said slider plate to move through its second cycle type.

* * * * *

UNITED STATES PATENT AND TRADEMARK OFFICE
CERTIFICATE OF CORRECTION

PATENT NO. : 8,935,921 B2  
APPLICATION NO. : 13/806487  
DATED : January 20, 2015  
INVENTOR(S) : Neil Tice Page 1 of 1

It is certified that error appears in the above-identified patent and that said Letters Patent is hereby corrected as shown below:

In the claims,
Column 11, Line 16, in claim 23, the word "do" should be the word "to"

Signed and Sealed this
First Day of March, 2016

Michelle K. Lee
*Director of the United States Patent and Trademark Office*